United States Patent
Koibuchi

(10) Patent No.: US 6,584,399 B2
(45) Date of Patent: *Jun. 24, 2003

(54) TRACTION CONTROL SYSTEM OF VEHICLES COMBINING FEEDBACK CONTROL WITH FEEDFORWARD CONTROL

(75) Inventor: Ken Koibuchi, Susono (JP)

(73) Assignee: Toyota Jidosha Kabushiki Kaisha, Toyota (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/157,678

(22) Filed: Sep. 22, 1998

(65) Prior Publication Data

US 2001/0003805 A1 Jun. 14, 2001

(30) Foreign Application Priority Data

Sep. 30, 1997 (JP) .............................. 9-282607

(51) Int. Cl.⁷ ........................... G06F 17/00; B60T 7/12; B60T 8/24; G05D 1/00
(52) U.S. Cl. ........................ 701/90; 701/69; 701/71; 701/72; 701/83; 701/84; 180/197
(58) Field of Search ............................. 701/71, 82, 83, 701/84, 90, 72, 73, 75, 69, 86, 88; 180/197

(56) References Cited

U.S. PATENT DOCUMENTS

| | | | | |
|---|---|---|---|---|
| 4,765,430 A | * | 8/1988 | Schulze et al. ............. 180/197 |
| 4,779,202 A | * | 10/1988 | Leiber ......................... 701/90 |
| 4,882,693 A | * | 11/1989 | Yopp ............................. 701/37 |
| 5,033,002 A | * | 7/1991 | Sol ............................. 701/90 |
| 5,051,908 A | * | 9/1991 | Shiraishi ..................... 701/75 |
| 5,197,008 A | * | 3/1993 | Itoh et al. .................... 701/70 |
| 5,243,526 A | * | 9/1993 | Ito et al. ..................... 701/70 |
| 5,272,635 A | * | 12/1993 | Nakayama ................. 180/197 |
| 5,357,798 A | * | 10/1994 | Weinzerl et al. ............. 73/146 |
| 5,494,345 A | | 2/1996 | Inagaki et al. .............. 303/163 |
| 5,636,121 A | * | 6/1997 | Tsuyama et al. ............. 701/70 |
| 5,668,724 A | * | 9/1997 | Ehret et al. .................. 701/80 |
| 5,702,165 A | | 12/1997 | Koibuchi ..................... 307/146 |
| 5,711,024 A | * | 1/1998 | Wanke ........................ 180/197 |
| 5,742,917 A | * | 4/1998 | Matsuno ...................... 701/69 |
| 5,813,732 A | * | 9/1998 | Monzaki et al. ............ 303/146 |
| 5,928,302 A | * | 7/1999 | Fukada ....................... 701/70 |
| 5,957,991 A | * | 9/1999 | Yasuda ....................... 701/84 |
| 6,035,251 A | * | 3/2000 | Hac et al. ................... 303/140 |
| 6,078,858 A | * | 6/2000 | Tozu et al. ................... 701/79 |

FOREIGN PATENT DOCUMENTS

| JP | A-7-127492 | 5/1995 |
|---|---|---|
| JP | A-7-174042 | 7/1995 |
| JP | A-8-310366 | 11/1996 |
| JP | A-9-99826 | 4/1997 |

OTHER PUBLICATIONS

K. Koibuchi et al., *Vehicle Stability Control in Limit Cornering by Active Brake*, Society of Automotive Engineers, Inc., 960487, 1996, pp. 163–173.

* cited by examiner

Primary Examiner—Jacques H. Louis-Jacques
Assistant Examiner—Brian J. Broadhead
(74) Attorney, Agent, or Firm—Oliff & Berridge, PLC

(57) ABSTRACT

A traction control system of a vehicle having a device for calculating a target traction torque of each of a pair of driving wheels based upon operating conditions of the vehicle, a device for calculating a target slip ratio of each of the pair of driving wheels based upon the target traction torque calculated therefor, and a device for controlling the engine and the brake system such that actual slip ratio of each of the pair of driving wheels coincides with the target slip ratio calculated therefor according to a feedback control, with a partial feedforward control of the engine and the brake system based upon the target traction torque.

13 Claims, 13 Drawing Sheets

TRACTION CONTROL SYSTEM OF VEHICLES COMBINING FEEDBACK CONTROL WITH FEEDFORWARD CONTROL

BACKGROUND OF THE INVENTION

1. Field of the Invention

The present invention related to a traction control of vehicles such as automobiles, and more particularly, to a traction control system of vehicles by which the traction. i.e. driving or braking, of a vehicle is controlled according to a combination of a feedback control and a feedforward control.

2. Description of the Prior Art

In Japanese Patent Laid-open Publications 7-127492 and 7-174042, it is described to control the driving torque of each of the driving wheels by a feedback control based upon a target driving torque calculated therefor based upon running conditions of the vehicle.

In Japanese Patent Laid-open Publications 8-310366 and 9-99826, it is described to control the braking force of each of the wheels by a feedback control such that a target yaw moment and a target deceleration to be generated in a vehicle are calculated based upon operating conditions thereof, a target braking force to be applied to each of the wheels is calculated based upon the target yaw rate and the target deceleration, a target slip ratio to occur at each of the wheels is calculated based upon the target braking force, and the brake pressure is controlled to let each of the wheels cause a slip ratio coinciding with the target slip ratio.

In general, a feedback control is much more reliable than a feedforward control in maintaining a parameter for control within a desired range, while a feedback control is less effective than a feedforward control in quickly controlling a parameter for control to a desired target value. From another point of view, a feedback control is superior to a feedforward control when a parameter to be controlled is not calculatable at high precision by theory, while, as a matter of course, a feedforward control is more effectively adaptable when a parameter to be controlled is calculatable at higher precision In the art of vehicle control, the parameters within the vehicles are nowadays generally calculatable at high precision by theories and computers, while in the traction control there still remains an obstruction for a high precision theoretical calculation in relation to the frictional contact between the wheels and the ground surface.

SUMMARY OF THE INVENTION

In view of the above, it is contemplated that the traction control of vehicles is further improved by incorporating a feedforward control into a traction control system based upon a feedback control, wherein the feedback control is essential for a final stage of control relying upon the frictional contact between the wheel tires and the ground surface not always theoretically correctly predictable.

Therefore, it is a primary object of the present invention to provide an improved traction control system of vehicles in which a feedback control is favorably combined with a feedforward control.

According to the present invention, the above-mentioned primary object is accomplished by a traction control system of a vehicle having a vehicle body, a plurality of wheels including at least one pair of driving wheels for suspending the vehicle body, an engine, a transmission for transmitting an output power of the engine to the driving wheels, a brake system for selectively braking rotation of at least the pair of driving wheels, and a steering system for steering the vehicle, the traction control system comprising:

means for calculating a target traction torque of each of the pair of driving wheels based upon operating conditions of the vehicle;

means for calculating a target slip ratio of each of the pair of driving wheels based upon the target traction torque calculated therefor, and means for controlling the engine and the brake system such that actual slip ratio of each of the pair of driving wheels coincides with the target slip ratio calculated therefor according to a feedback control, with a partial feedforward control of the engine and the brake system based upon the target traction torque.

By the traction control system of a vehicle being constructed as described above, the engine and the brake system thereof are controlled to accomplish a slip ratio at each of the pair of driving wheels theoretically calculated for obtaining a desired operation performance of the vehicle according to such a feedback manner in reference to the actual ground surface condition that, when the actual ground surface condition is different from its estimation, the theoretical calculation is automatically modified to reflect the difference in estimation thereon through corresponding changes of parameters for the theoretical calculation, while the engine and the brake system are directly modified according to the result of the theoretical calculation for the slip ratio at each of the pair of driving wheels according to the feedforward manner. Therefore, it is accomplished that the quickness of the response of control of the traction control system of a vehicle is improved, while ensuring that the vehicle is controlled to perform without much departing from a desired operating condition even when the ground surface condition changes beyond a reasonable estimation.

In the above-mentioned traction control system, the engine and brake system control means comprises: means for calculating a feedback traction torque of each of the pair of driving wheels which will cancel a difference between the calculated slip ratio and the actual slip ratio of each of the pair of driving wheels; means for calculating a sum of a value of the calculated target traction torque weighted with a feedforward control weighting factor and a value of the feedback traction torque weighted with a feedback control weighting factor with respect to each of the pair of driving wheels; and means for controlling the engine to generate an output torque corresponding to the weighted sum of the target traction torque and the feedback traction torque with respect to each of the pair of driving wheels when the weighted sum is positive, while controlling the brake system to generate a braking torque at each of the pair of driving wheels corresponding to the weighted sum of the target traction torque and the feedback traction torque when said weighted sum is negative.

The feedforward control weighting factor and the feedback control weighting factor may be complementary to one another.

Further, the means for calculating the weighted sum of the feedforward traction torque and the feedback traction torque may include means for temporarily lowering the feedforward control weighting factor when the vehicle is running with an engine braking.

The means for calculating the feedback traction torque may comprise means for temporarily modifying the calculation of the feedback traction not to be dependent upon the target traction torque but to be dependent substantially upon vehicle speed when the vehicle is running with an engine braking.

Further, the means for calculating the feedback traction torque may also comprise means for temporarily modifying the calculation of the feedback traction torque not to be dependent upon the target traction torque but to be dependent substantially upon vehicle speed when a target slip ratio calculated based upon the target traction torque is larger than a predetermined threshold value.

The target traction torque calculation means may further comprise means for calculating a yaw moment of the vehicle based upon steering angle of the steering system and vehicle speed; means for equating the calculated yaw moment to a corresponding balance between a pair of traction forces of the pair of driving wheels; means for equating a longitudinal acceleration of the vehicle to a corresponding sum of a pair of traction forces of the pair of driving wheels; and means for deducing the values of the pair of traction forces from the above two relationships with regard to the yaw moment and the longitudinal acceleration.

In this case, the target traction torque calculation means may further comprises: means for calculating a friction circle of each of the pair of driving wheels; and means for trimming each of the deduced values of the pair of traction forces to be within each corresponding one of the friction circles calculated therefor.

In this case, further, the friction circle calculation means may comprise: means for calculating each of longitudinal forces acting at the pair of driving wheels as a sum of a corresponding share of a force accelerating the vehicle at a longitudinal acceleration thereof, a force exerted thereto by the brake system, and a force for acceleration of rotation thereof against the inertia thereof; means for calculating a longitudinal force acting at each of the pair of driving wheels as a sum of a corresponding share of a longitudinal force corresponding to an output torque of the torque converter calculated based upon rotation speed of the engine, a force exerted thereto by the brake system, and a force for acceleration of rotation thereof against the inertia thereof; means for calculating each of ground contact forces acting at all of the wheels based upon longitudinal acceleration of the vehicle and lateral acceleration of the vehicle; means for calculating each of ground contact forces acting at all of the wheels based upon longitudinal acceleration of the vehicle and lateral acceleration of the vehicle; means for calculating slip angle of the vehicle body based upon lateral acceleration of the vehicle, vehicle speed and yaw rate; means for calculating each of cornering forces of the pair of driving wheels based upon vehicle speed, a time based differential of the calculated slip angle of the vehicle, yaw rate and a time based differential thereof of the vehicle, and the ground contact forces calculated for all of the wheels; and means for calculating a root of a sum of a square of the longitudinal force and a square of the cornering force with respect to each of the pair of driving wheels.

Further, the means for calculating the longitudinal forces acting at each of the pair of driving wheels may cancel the longitudinal force based upon the output torque of the torque converter when the transmission is being shifted between speed stages.

Further, the friction circle calculation means may further comprise means for judging if wheel speed of each of the pair of driving wheels is larger than vehicle speed beyond a first predetermined difference over a predetermined duration; and means for decreasing the radius of the friction circle of the corresponding wheel when the answer of the judgment is yes.

Further, the friction circle calculation means may further comprise means for judging if wheel speed of each of the pair of driving wheels is larger than vehicle speed beyond a second predetermined difference larger than the first predetermined difference; and means for decreasing the radius of the friction circle of the corresponding wheel when the answer of the judgment is yes.

In the above construction, the friction circle calculation means may further comprise means for regaining the radius of the friction circle of the corresponding wheel when the answer of the judgment is no up to a standard friction circle radius.

BRIEF DESCRIPTION OF THE DRAWINGS

In the accompanying drawings.

DESCRIPTION OF THE EMBODIMENTS

Figure 1A:
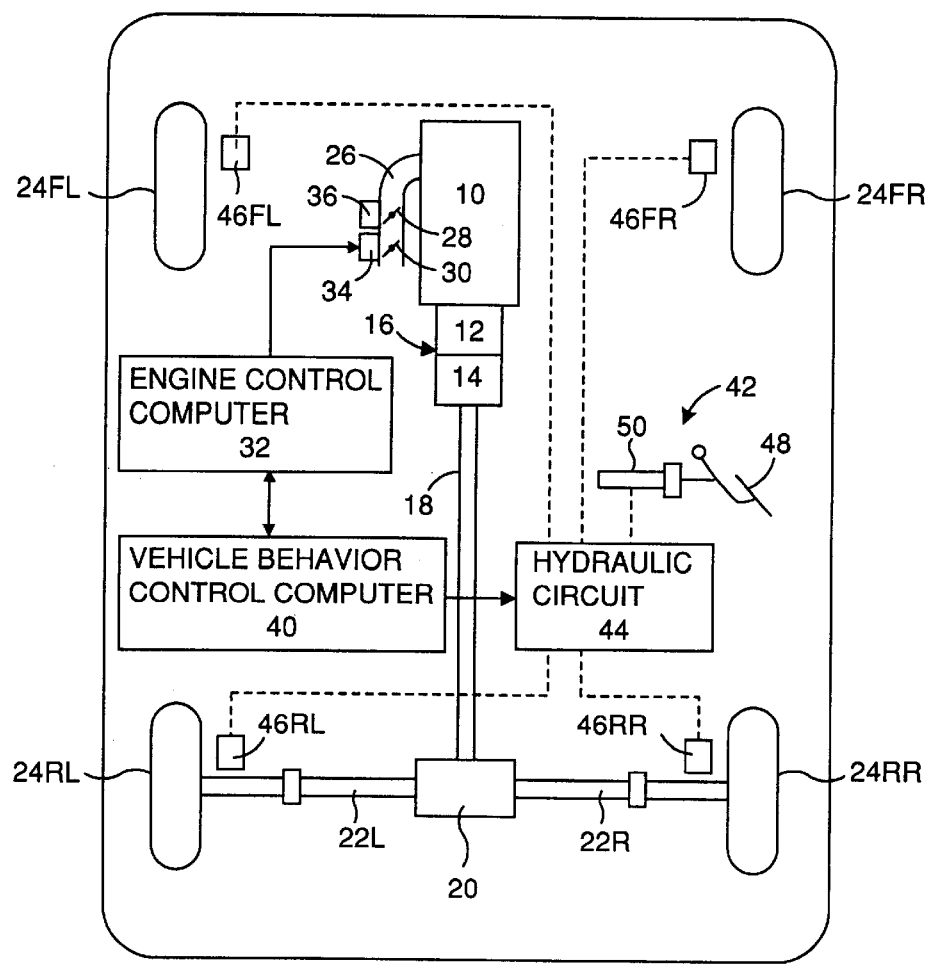
FIG. 1A is a diagrammatical illustration of a vehicle constructed as a four-wheel vehicle driven by a pair of rear wheels, in which the traction control system according to the present invention is incorporated.

Referring to FIG. 1A diagrammatically illustrating a vehicle, the vehicle body shown by a rectangle rounded at four corners is suspended by front left, front right, rear left and rear right wheels 24FL, 24FR, 24RL and 24RR. 10 is an engine which drives the pair of rear wheels 24RL and 24RR through torque converter 12, transmission gear 14, propeller shaft 18, differential gear 20 and axles 22L and 22R, respectively. The engine has an intake passage 26 controlled by a main throttle 28 adapted to be operated by the driver through an accelerator pedal not shown in the figure and an actuator and a sub-throttle valve 30 placed under the control of an engine control computer 32 via an actuator 34. The vehicle also has a vehicle behavior control computer 40 connected with the engine control computer 32. 42 indicates a brake system of the vehicle, including a brake pedal 48 adapted to be depressed by the driver, a master cylinder 50 and a hydraulic circuit 44 connected with the master cylinder 50. The hydraulic circuit 44 is also controlled by the vehicle behavior control computer 40. The hydraulic circuit 44 incorporates therein wheel cylinders 46FL, 46FR, 46RL and 46RR for braking the front left, front right, rear left and rear right wheels, respectively. Such a hydraulic circuit of the brake system for a behavior control of the vehicle is already known in the art of the behavior control of vehicles. An example of such a hydraulic circuit is shown in U.S. Pat. No. 5,702,165 filed by the same inventor and assigned to the same assignee. Further, the vehicle incorporates a steering system for steering the pair of front wheels 24FL and 24FR, though not shown in the figure.

Figure 1B:
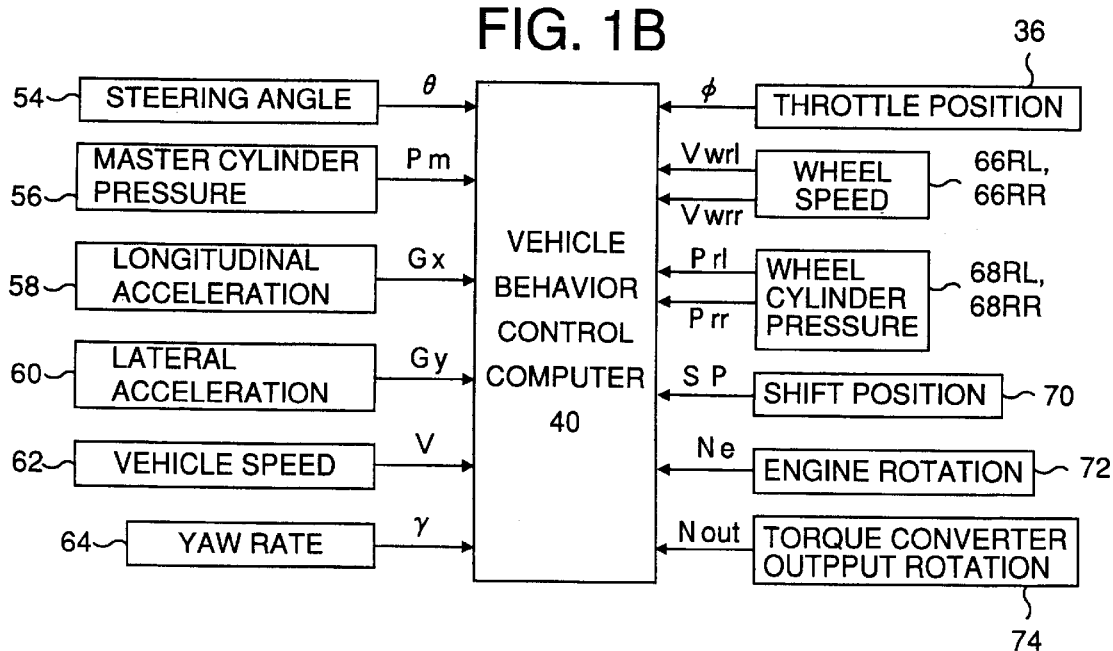
FIG. 1B is a diagram illustrating the vehicle behavior control computer 40 shown in FIG. 1A and various sensors for supplying signals thereto.

As shown in FIG. 1B, the vehicle behavior control computer 40 is supplied with information about values of various parameters regarding operating conditions of the vehicle, such as steering angle $\theta$ from a steering angle sensor 54, master cylinder pressure Pm from a master cylinder pressure sensor 56, longitudinal acceleration Gx of the vehicle body from a longitudinal acceleration sensor 58, lateral acceleration Gy of the vehicle body from a lateral acceleration sensor 60, vehicle speed V from a vehicle speed sensor 62, yaw rate $\gamma$ of the vehicle body from a yaw rate sensor 64, throttle position $\phi$ of the throttle valve 28 representing the driver's will for acceleration of the vehicle from a throttle position sensor 36, wheel speeds including Vwrl and Vwrr of the rear left and right wheels from wheel speed sensors including 66RL and 66RR for the rear left and right wheels, wheel cylinder pressures including Prl and Prr of the rear left and right wheels from wheel cylinder pressure sensors including 68RL and 68RR for the rear left and right wheels, shift position SP of the transmission 14 from a shift position sensor 70, engine rotation speed Ne from an engine rotation sensor 72, and torque converter output rotation speed Nout from a torque converter output rotation sensor 74. The vehicle behavior control computer 40 conducts various control calculations such as described hereinbelow and dispatches control signals to the engine control computer 32 and the hydraulic circuit 44 for executing the calculated control through the throttle valve 30 and the wheel cylinders 46FL–46RR.

In the following, the traction control system of the present invention will be described in the form of the control operations thereof executed by the vehicle behavior control computer 40 which itself may be of a conventional type well known in the art, including standard components such as central processing unit, read only memory, random access memory, input and output port means and a common bus interconnecting these components.

Figure 2:
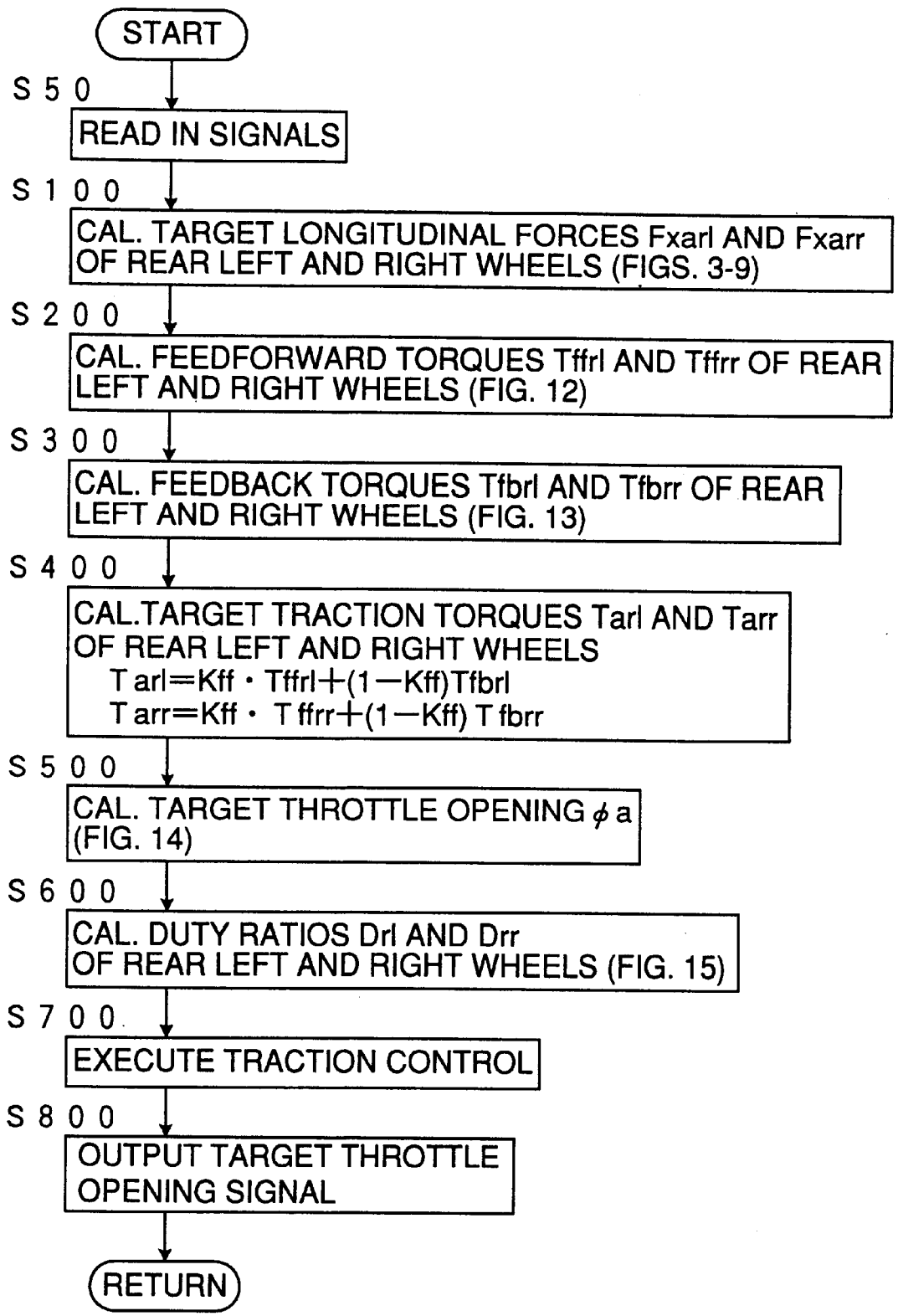
FIG. 2 is a flowchart showing a main routine of the operation of the traction control system according to the present invention.

Referring to FIG. 2 showing the main routine of the control operations executed by the traction control system of the present invention, in step 50, signals are read in from those sensors shown in FIG. 1B.

Figure 5:
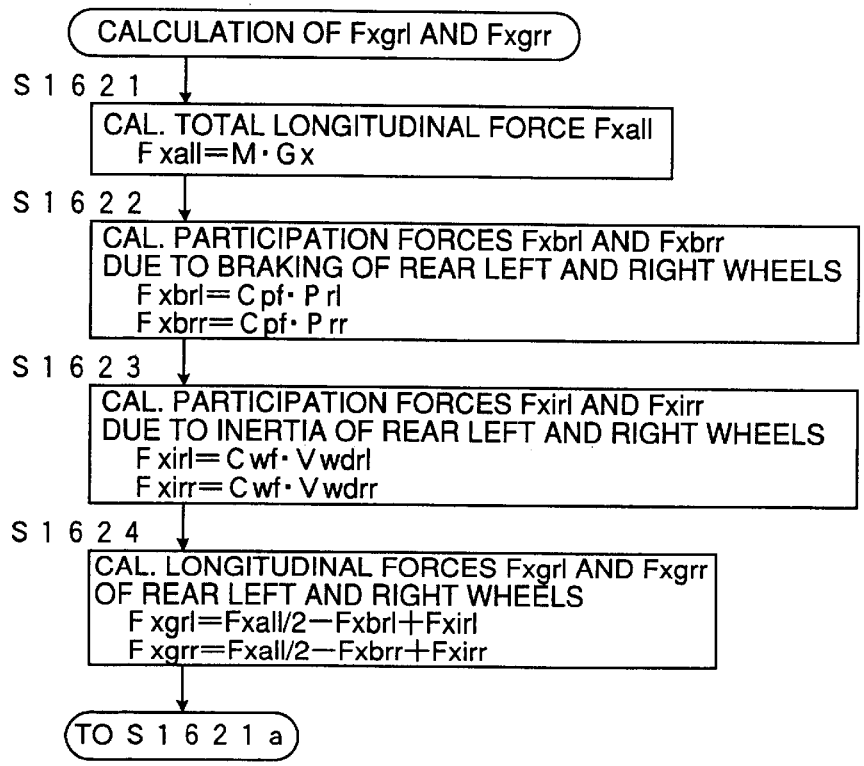
FIG. 5 is a flowchart showing a subroutine executed in step 160 of FIG. 3 for a calculation of longitudinal forces Fxgrl and Fxgrr of the rear left and right wheels based upon longitudinal acceleration.
Figure 6:
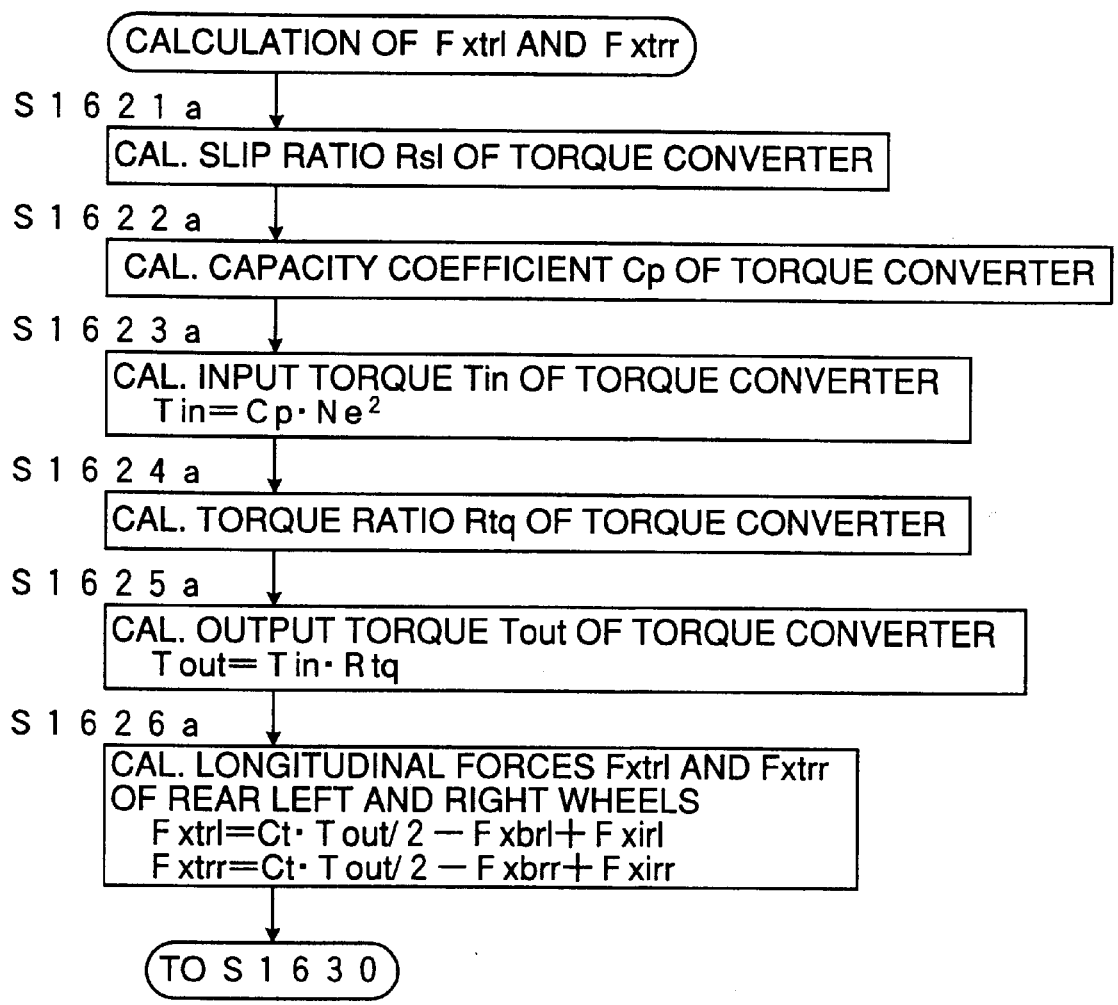
FIG. 6 is flowchart showing a subroutine executed in step 160 of FIG. 3 for a calculation of longitudinal forces Fxtrl and Fxtrr of the rear left and right wheels based upon torque converter output torque.

In step 100, target longitudinal forces denoted Fxrl and a Fxrr of the rear left and right wheels are calculated according to the processes described later with reference to FIGS. 3–9. The target longitudinal forces of the rear left and right wheels mean the longitudinal forces to be generated at the rear left and right wheels, respectively, for controlling the vehicle to behave desirably according to the driver's will for steering and acceleration or deceleration, with incorporation of an automatic vehicle behavior control executed by the vehicle behavior control computer 40. As described in detail later with reference to FIGS. 4–6, the target longitudinal forces denoted Fxrl and Fxrr are respectively mean values of longitudinal forces Fxarl and Fxarr calculated as shown in FIG. 5 based upon the longitudinal acceleration detected by the longitudinal acceleration sensor 58, the wheel cylinder pressures Prl and Prr detected by the wheel cylinder pressure sensors 68RL and 68RR and the rotational inertia of the rear left and right wheels, and longitudinal forces Fxtrl and Fxtrr calculated as shown in FIG. 6 based upon the input and output rotational speeds of the torque converter, the wheel cylinder pressures Prl and Prr and the rotational inertial of the wheels.

In step 200, feedforward torques denoted Tffrl and Tffrr of the rear left and rear right wheels are calculated as described in detail later with reference to FIG. 12 . The feedforward torques of the rear left and right wheels mean feedforward control inputs in the quantity of torque for the traction control of the rear left and right wheels, respectively, by the present traction control system.

In step 300, feedback torques denoted Tfbrl and Tfbrr of the rear left and right wheels are calculated as described in detail later with reference to FIG. 13. The feedback torques of the rear left and right wheels mean feedback control inputs in the quantity of torque for the traction control for the traction control of the rear left and right wheels, respectively, by the present traction control system.

In step 400, target traction torques denoted Tarl and Tarr of the rear left and right wheels are calculated as follows:

$$Tarl = Kff \cdot Tffrl + (1-Kff) \cdot Tfbrl$$

$$Tarr = Kff \cdot Tffrr + (1-Kff) \cdot Tfbrr$$

As will be apparent from the above equations, the target traction torques Tarl and Tarr are the total control inputs for the traction control of the rear left and right wheels, respectively, in the present traction control system. As will be noted, Kff is a factor weighting the effect of the feedforward control, while the effect of the feedback control is weighted by a factor (1–Kff).

In step 500, target throttle opening $\phi a$ is calculated as described in detail later with reference to FIG. 14. The target throttle opening $\phi a$ is the totally effective throttle opening provided by the combination of the throttle valves 28 operated by the driver and the throttle valve 30 automatically controlled by the vehicle behavior control computer 40 through the engine control computer 32 and the actuator 34. The target throttle opening $\phi a$ indicates the output of the traction control toward the engine control computer 32 for executing a part of the total of the traction control through the engine output.

In step 600, duty ratios denoted Drl and Drr of the rear left and right wheels are calculated as described in detail later with reference to FIG. 15. The duty ratios Drl and Drr indicate control outputs toward the hydraulic circuits 44 for executing a part of the total of the traction control through the wheel cylinders 46RL and 46RR.

In this connection, it will be noted that, although only the duty ratios Drl and Drr of the rear left and right wheels are discussed herein, since the embodiment of the vehicle herein discussed is a rear drive vehicle, the vehicle behavior control computer 40 may and will indeed be designed to operate also the wheel cylinders 46FL and 46FR at the same time of operating the wheel cylinders 46RL and 46RR through the hydraulic circuit 44. Such a simultaneous operation of the wheel cylinders of the front wheels may be incorporated into the concrete design of the control operation, or the operation of the wheel cylinders of the front wheels may be indirectly incorporated into the traction control by a feedback which causes a corresponding deceleration of the vehicle speed.

In step 700, the traction control is executed based upon the calculation of the target throttle opening φa in step 500 and the calculation of the duty ratios Drl and Drr in step 600.

In step 800, a target throttle opening signal is output as an indication for the driver.

Now, referring to FIGS. 3–9, the calculations of step 100 will be described in detail.

Figure 3:
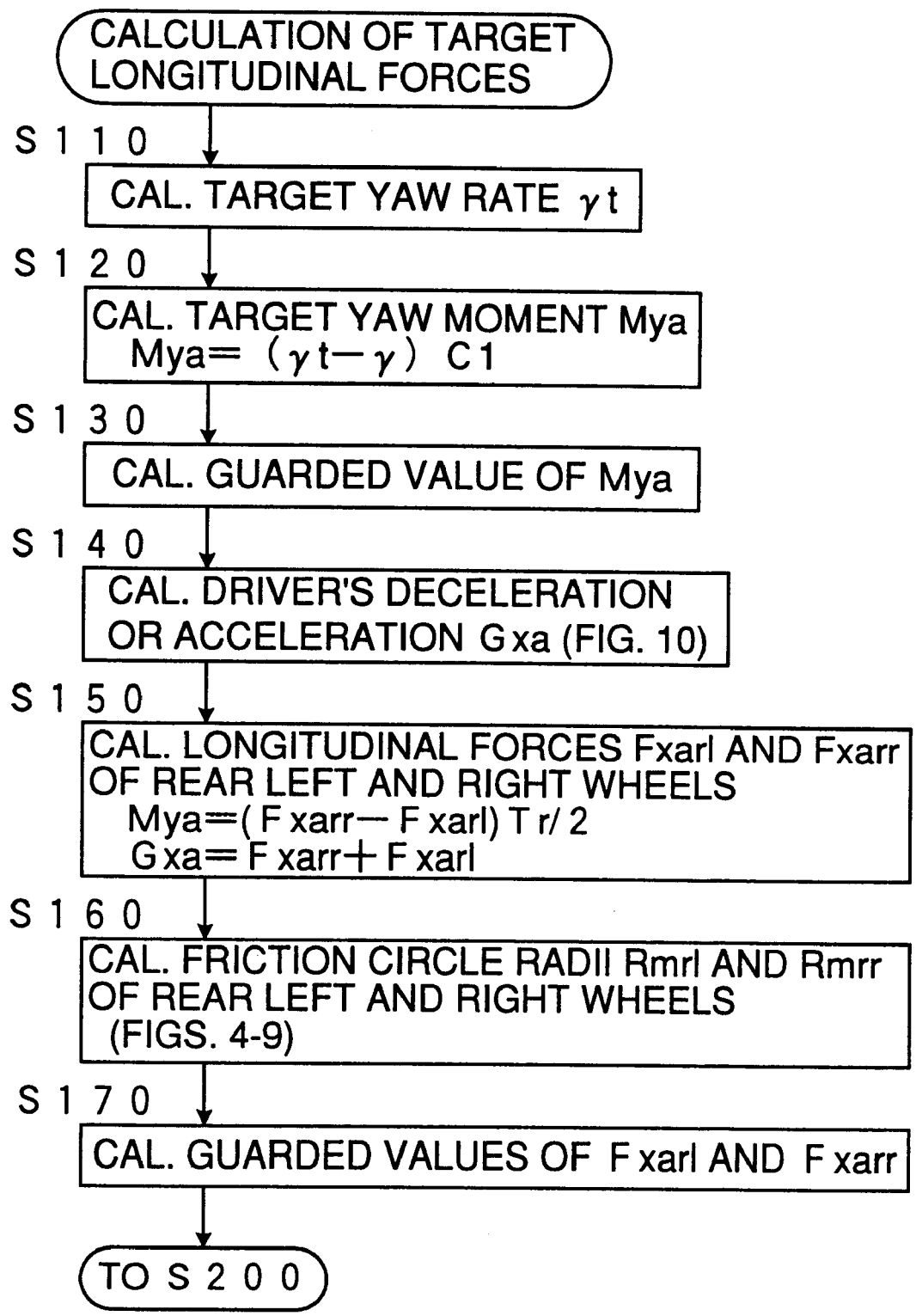
FIG. 3 is a flowchart showing a subroutine executed in step 100 of FIG. 2 for a calculation of target longitudinal forces.

FIG. 3 is a subroutine corresponding to the whole of step 100, entitled Calculation of Target Longitudinal Forces. Some steps of this routine will be described for further details with reference to FIGS. 4–9.

In step 110, a target yaw rate γt is calculated based upon vehicle speed V detected by the vehicle speed sensor 62 and steering angle θ detected by the steering angle sensor 54 according to the below-mentioned equations, wherein L is the wheel base of the vehicle, Kh is an appropriate stability factor, T is an appropriate time constant and s is the Laplace operator:

$$\gamma c = V \cdot \theta / (1 + Kh \cdot V^2) \cdot L$$

$$\gamma t = \gamma c / (1 + T \cdot s)$$

In step 120, a target yaw moment Mya is calculated as a difference between the target yaw rate γt and the actual yaw rate γ detected by the yaw rate sensor 64, with an appropriate proportioning factor C1, as follows:

$$Mya = C1 \cdot (\gamma t - \gamma)$$

As will be apparent from the above calculations, the target yaw moment Mya is a yaw moment to be applied to the vehicle to let it follow more desirably to the driver's will for steering.

In step 130, the value of Mya calculated above is trimmed not to be too large for ensuring the stability of the vehicle behavior, so that a guarded value of Mya is calculated.

Figure 10:
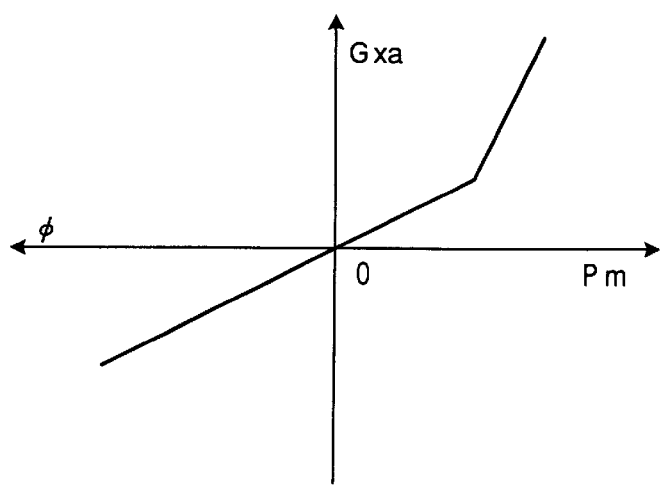
FIG. 10 is a graph showing the relationship between longitudinal acceleration Gxa of the vehicle and master cylinder pressure Pm or throttle opening $\phi$.

In step 140, a target deceleration denoted Gxa is calculated by referring to a map like a graph shown in FIG. 10 according to the value of the master cylinder pressure Pm or the value of the throttle position φ detected by the throttle position sensor 36, both indicating the driver's will for deceleration or acceleration of the vehicle.

In step 150, longitudinal forces denoted Fxarl and Fxarr of the rear left and right wheels are calculated by solving the below-mentioned two equations, wherein Tr is the tread of the vehicle:

$$Mya = (Fxarr - Fxarl) \cdot Tr/2$$

$$Gxa = Fxarr + Fxarl$$

In step 160, friction circle radii denoted Rmrl and Rmrr of the rear left and rear right wheels are calculated according to the calculations shown in FIGS. 4–9. As well known in the art, the friction circle is a circle indicating the limit of the tire grip force against the ground surface in vector turned about the center of contact between the tire and the ground surface, such that when the vector addition of longitudinal and lateral forces acting at a wheel is within the friction circle, the grip of the wheel to the ground is ensured.

In step 170, the values of Fxarl and Fxarr calculated in step 150 are trimmed by the respective friction circles to obtain guarded values of Fxarl and Fxarr. Then, the control proceeds to step 200 of FIG. 2.

Further details of the calculation processes executed in step 160 of FIG. 3 will be described with reference to FIGS. 4–9. The flowchart of FIG. 4 entitled Calculation of Friction Circle Radii shows the calculation of step 160 of FIG. 3 in further details.

In step 1620, longitudinal forces denoted Fxgrl and Fxgrr of the rear left and right wheels are calculated based upon longitudinal acceleration Gx detected by the longitudinal acceleration sensor 58 as described in detail later with reference to FIG. 5 and longitudinal forces denoted Fxtrl and Fxtrr of the rear left and right wheels are calculated based upon input and output rotation speeds of torque converter as described in detail later with reference to FIG. 6.

In step 1630, ground contact forces Fzj (j=fl, fr, rl and rr) of the four wheels are calculated as described in detail with reference to FIG. 7.

In step 1640, cornering forces Fyj (j=fl, fr, rl and rr) of the four wheels are calculated as described in detail with reference to FIG. 8.

In step 1650, it is judged if the speed stage of the transmission is being shifted. If the answer is no, the control proceeds to step 1660, and a factor Kx is made 1, whereas when the answer is yes, control proceeds to step 1670, and the factor Kx is made 0. As will be noted in the next step, the factor Kx is to cancel the effect of the longitudinal forces Fxtrl and Fxtrr calculated based upon the input and output rotation speeds of the torque converter when the transmission is being shifted, considering that the relationship between the input and output rotation speeds of the torque converter will be substantially disturbed during speed stage shiftings.

In step 1680, the mean longitudinal forces Fxrl and Fxrr of the rear left and right wheels are calculated as a mean value of the longitudinal forces Fxgrl and Fxgrr based upon the longitudinal acceleration Gx and the longitudinal forces Fxtrl and Fxtrr based upon the input and output rotation speeds of the torque converter, with the factor Kx for temporarily canceling the participation of Fxtrl and Fxtrr, as follows:

$$Fxrl = (Fxgrl + Kx \cdot Fxtrl)/2$$

$$Fxrr = (Fxgrr + Kx \cdot Fxtrr)/2$$

In step 1690, friction circle radii Rmrl and Rmrr of the rear left and right wheels are calculated as described in detail later with reference to FIG. 9.

Thus, the calculations of step 160 of FIG. 3 are completed, and then the control proceeds to step 170 of FIG. 3.

The calculations of the longitudinal forces Fxgrl and Fxgrr in step 1620 of FIG. 4 will be described in detail with reference to FIG. 5 showing a subroutine entitled Calculation of Fxgrl and Fxgrr.

In step 1621, total longitudinal force denoted Fxall is calculated as a product of the mass of the vehicle denoted M and the longitudinal acceleration Gx detected by the longitudinal acceleration sensor 58.

In step 1622, participation forces denoted Fxbrl and Fxbrr due to the braking of the rear left and right wheels are calculated based upon the wheel cylinder pressures Prl and Prr detected by the wheel cylinder pressure sensors 68RL and 68RR, with an appropriate proportional conversion factor Cpf, as follows:

$$Fxbrl=Cpf \cdot Prl$$

$$Fxbrr=Cpf \cdot Prr$$

In step 1623, participation forces denoted Fxirl and Fxirr due to the inertia of the rear left and right wheels are calculated based upon the wheel speeds Vwrl and Vwrr of the rear left and right wheels detected by the wheel speed sensors 66RL and 66RR, by calculating time based differentials Vwdrl and Vwdrr of Vwrl and Vwrr, respectively, with an appropriate proportional conversion factor Cwf, as follows:

$$Fxirl=Cwf \cdot Vwdrl$$

$$Fxirr=Cwf \cdot Vwdrr$$

In step 1624, longitudinal forces denoted Fxgrl and Fxgrr of the rear left and right wheels are calculated as a combination of the longitudinal forces calculated in steps 1621, 1622 and 1623, as follows:

$$Fxgrl=Fxall/2-Fxbrl+Fxirl$$

$$Fxgrr=Fxall/2-Fxbrr+Fxirr$$

Then, the control proceeds to step 1621a of FIG. 6 showing a subroutine entitled Calculation of Fxtrl and Fxtrr.

In step 1621a, according to the rotation speed Ne of the engine 10 detected by the engine rotation sensor 72, and the output rotation speed Nout of the torque converter 12 detected by the torque converter output rotation sensor 74, slip ratio Rsl of the torque converter is calculated as follows:

$$Rsl=Ne/Nout \text{ (when } Ne \geq Nout\text{)}$$

$$Rsl=Nout/Ne \text{ (when } Ne<Neout\text{)}$$

In step 1622a, capacity coefficient Cp of the torque converter is obtained based upon the slip ratio Rsl by referring to a map presenting the operation performance of the torque converter not shown in the figure but well known in the art.

In step 1623a, input torque Tin of the torque converter is calculated based upon its input rotation speed, i.e. the engine rotation speed Ne as follows:

$$Tin=Cp \cdot Ne^2$$

In step 1624a, the torque ratio Rtq of the torque converter is calculated based upon the slip ratio Rsl by referring to a map presenting the pertinent performance of the torque converter not shown in the figure but well known in the art.

In step 1625a, output torque Tout of the torque converter is calculated based upon the input torque Tin and the torque ratio Rtq as follows:

$$Tout=Tin \cdot Rtq$$

In step 1626a, the participation forces Fxtrl and Fxtrr due to the braking of the rear left and right wheels are calculated by incorporating the participation forces Fxbrl and Fxbrr due to braking calculated in step 1622 of FIG. 5 and the participation forces Fxirl and Fxirr due to inertia of the wheels calculated in step 1623 of FIG. 5, as follows, wherein Ct is an appropriate proportioning factor:

$$Fxtrl=Ct \cdot Tout/2-Fxbrl+Fxirl$$

$$Fxtrr=Ct \cdot Tout/2-Fxbrr+Fxirr$$

Figure 4:
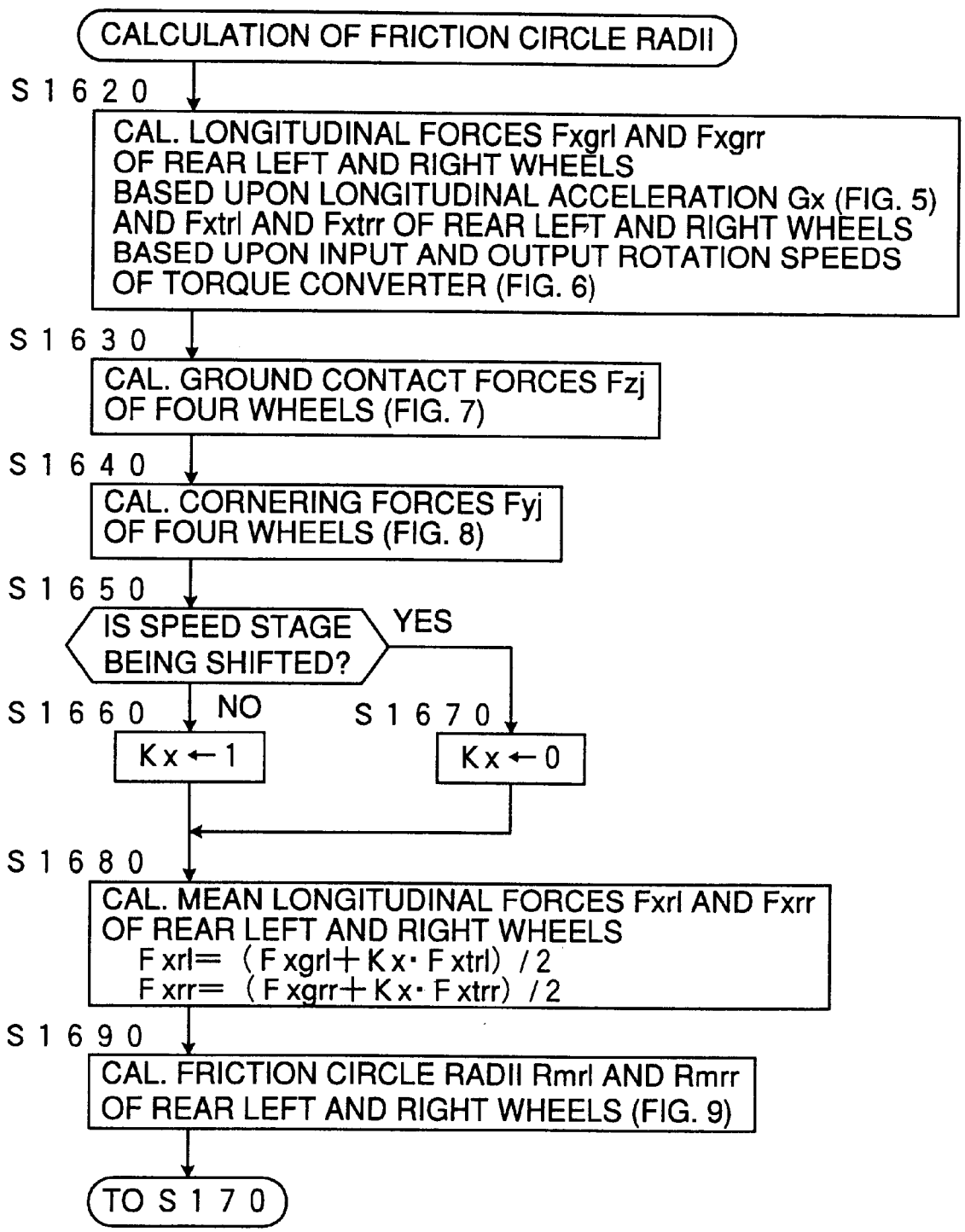
FIG. 4 is a flowchart showing a subroutine executed in step 160 of FIG. 3 for a calculation of friction radii.

Thus, the calculations in step 1620 of FIG. 4 are completed. Then, the control proceeds to step 1630.

Figure 7:
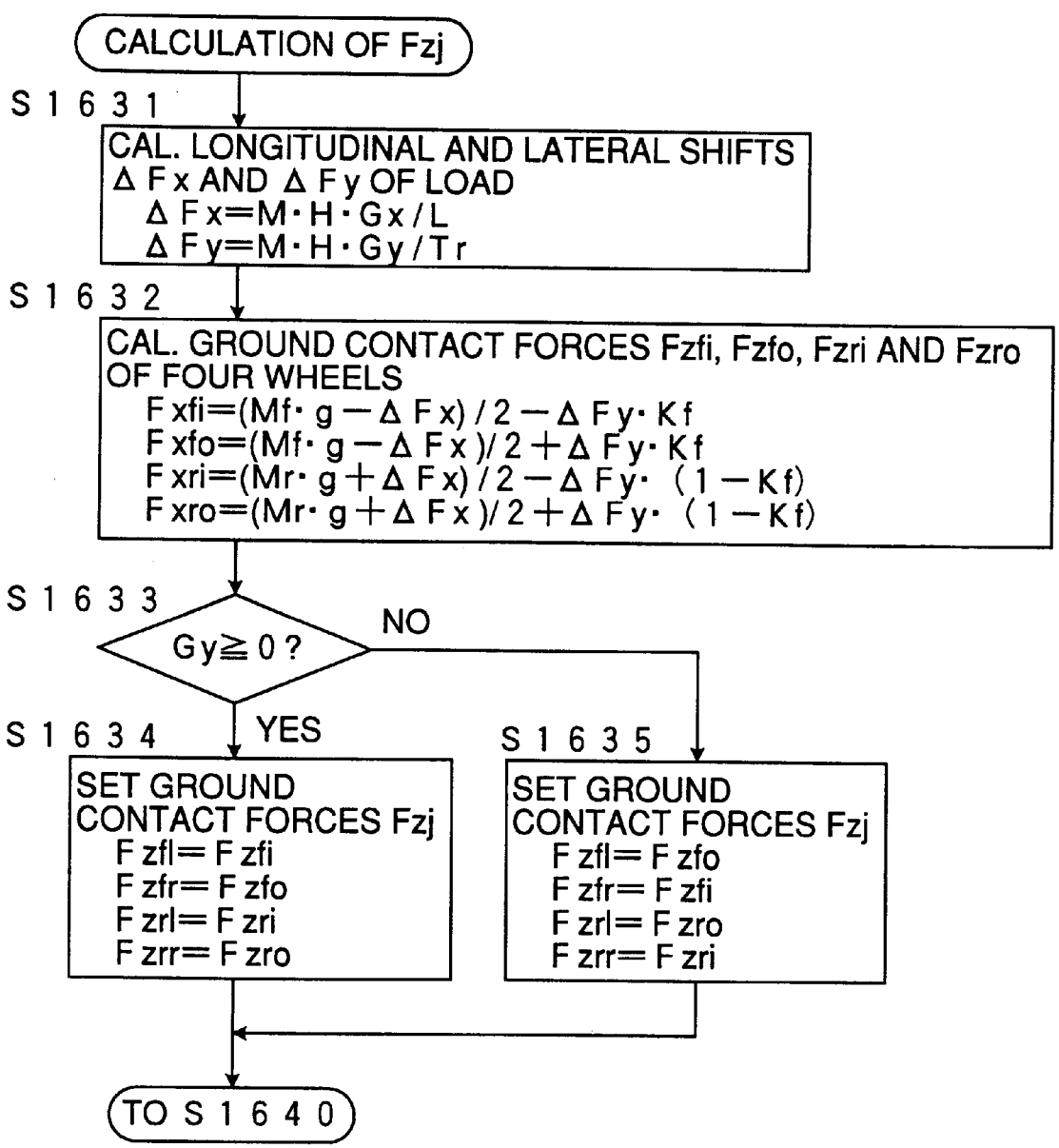
FIG. 7 is flowchart showing a subroutine executed in step 160 of FIG. 3 for a calculation of ground contact forces of the four wheels.

The detail of step 1630 of FIG. 4 will be described in detail with reference to FIG. 7 showing a subroutine entitled Calculation of Fzj.

In step 1631, longitudinal and lateral shifts of the load of the vehicle are calculated as ΔFx and ΔFy, respectively, based upon the mass M of the vehicle, height H of the center of gravity of the vehicle above the ground surface, the wheel base L, the tread Tr, and the longitudinal and lateral accelerations Gx and Gy detected by the longitudinal acceleration sensor 58 and the lateral acceleration sensor 60, respectively:

$$\Delta Fx=M \cdot H \cdot Gx/L$$

$$\Delta Fy=M \cdot H \cdot Gy/Tr$$

In step 1632, ground contact forces Fzfi, Fzfo, Fzri and Fzro of the front wheels at the inside and outside of a turn and the rear wheels at the inside and outside of the turn are calculated as follows, wherein Mf and Mr are the shares of the mass of the vehicle to the front and rear wheels, g is the acceleration of gravity, and Kf is a ratio for distributing the force due to a longitudinal twisting of the vehicle body to the front wheels:

$$Fxfi=(Mf \cdot g-\Delta Fx)/2-\Delta Fy \cdot Kf$$

$$Fxfo=(Mf \cdot g-\Delta Fx)/2+\Delta Fy \cdot Kf$$

$$Fxri=(Mr \cdot g+\Delta Fx)/2-\Delta Fy \cdot (1-Kf)$$

$$Fxro=(Mr \cdot g+\Delta Fx)/2+\Delta Fy \cdot (1-Kf)$$

In step 1633, it is judged if the lateral acceleration Gy detected by the lateral acceleration sensor 60 is positive or not. As is usual in this art, it is assumed that a positive value of Gy indicates a left turn of the vehicle, and vice versa. Therefore, when the answer of step 1633 is yes, the control proceeds to step 1634, and the ground contact forces Fzj (j=fl, fr, rl and rr) are set as follows:

$$Fzfl=Fzfi$$

$$Fzfr=Fzfo$$

$$Fzrl=Fzri$$

$$Fzrr=Fzro$$

When the answer of step 1633 is no, the control proceeds to step 1635, and the contact forces Fzj are set as follows:

$$Fzfl=Fzfo$$

$$Fzfr=Fzfi$$

$$Fzrl=Fzro$$

$$Fzrr=Fzri$$

Thus, the calculations of step 1630 are completed. Then the control proceeds to step 1640 of FIG. 4.

Figure 8:
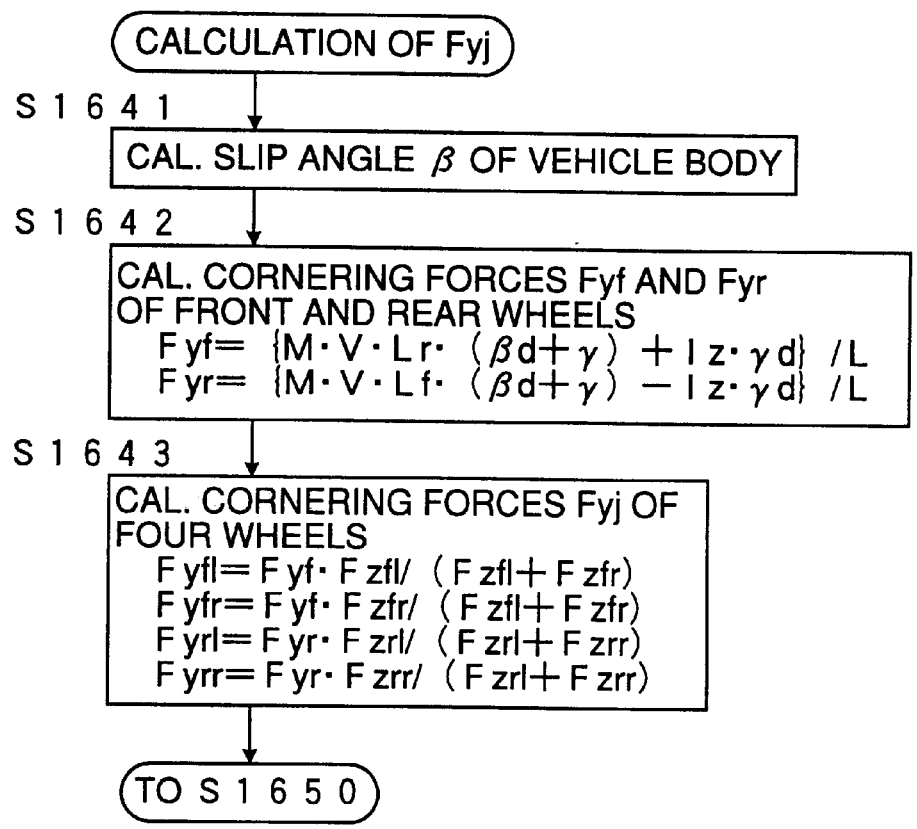
FIG. 8 is a flowchart showing a subroutine executed in step 160 of FIG. 3 for a calculation of cornering forces of the four wheels.

The details of the calculations executed in step 1640 of FIG. 4 will be described with reference to FIG. 8 showing a subroutine entitled Calculation of Fyj.

In step 1641, the slip angle β of the vehicle body is calculated based upon lateral acceleration Gy, vehicle speed V and yaw rate γ detected by the corresponding sensors shown in FIG. 1B such that, first a difference between the actual lateral acceleration Gy and a due lateral acceleration expressed by a product of vehicle speed V and yaw rate γ is calculated as Gy−V·γ, then the difference is integrated on time basis to obtain side slide velocity Vy, and then the side slide velocity Vy is divided by longitudinal velocity Vx of the vehicle, substituted by vehicle speed V, such as β=Vy/V.

In step 1642, cornering forces Fyf and Fyr of the front and rear wheels are calculated as follows, wherein Lf and Lr are distances between the central axes of the front and rear axles and the center of gravity of the vehicle, respectively, Iz is an inertial moment of the vehicle in its yawing movements, and βd and γd are time based differentials of the slip angle β and the yaw rate γ, respectively:

$$Fyf=\{M\cdot V\cdot Lr\cdot(\beta d+\gamma)+Iz\cdot\gamma d\}/L$$

$$Fyr=\{M\cdot V\cdot Lf\cdot(\beta d+\gamma)-Iz\cdot\gamma d\}/L$$

In step 1643, the cornering forces Fyj (j=fl, fr, rf and rr) of the four wheels are calculated as follows:

$$Fyfl=Fyf\cdot Fzfl/(Fzfl+Fzfr)$$

$$Fyfr=Fyf\cdot Fzfr/(Fzfl+Fzfr)$$

$$Fyrl=Fyr\cdot Fzrl/(Fzrl+Fzrr)$$

$$Fyrr=Fyr\cdot Fzrr/(Fzrl+Fzrr)$$

Thus, the calculations in step 1640 of FIG. 4 are completed. Then the control proceeds to step 1650 in FIG. 4.

Figure 9:
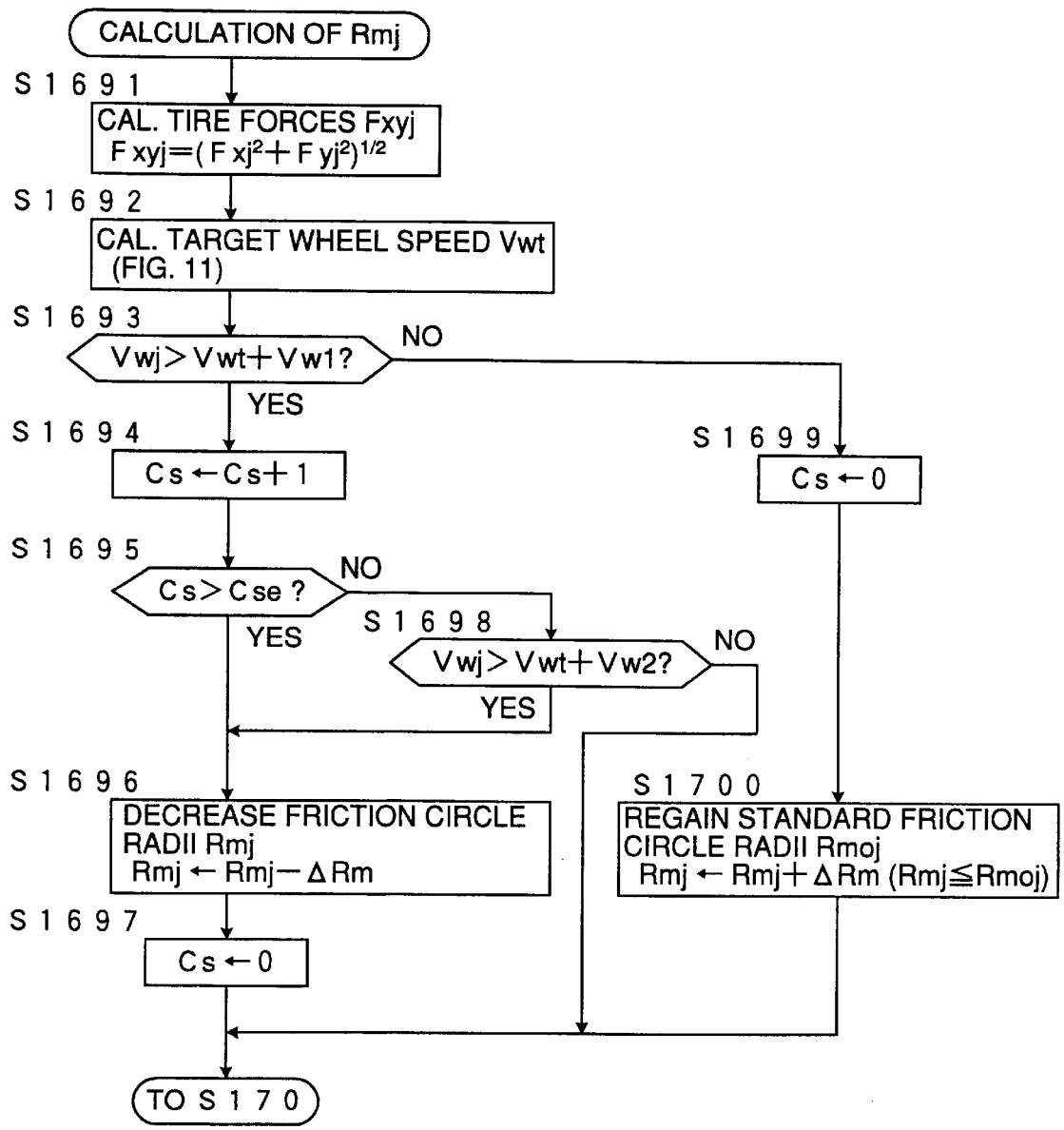
FIG. 9 is a flowchart showing a subroutine executed in step 160 of FIG. 3 for a calculation of friction circle radii of the four wheels.

The details of the calculations of step 1690 of FIG. 4 will be described with reference to FIG. 9 showing a subroutine entitled Calculation of Rmj.

In step 1691, tire forces Fxyj (j=rl and rr) are calculated with respect to the rear left and right wheels based upon the longitudinal forces Fxrl and Fxrr calculated in step 1680 of FIG. 4 and the lateral or cornering forces Fyrl and Fyrr calculated in step 1643 of FIG. 8, as follows:

$$Fxyj=(Fxj^2+Fyj^2)^{1/2}(j=rl \text{ and } rr)$$

If the tire force Fxyrl or Fxyrr does not exceed the radius of the friction circle of the rear left or rear right wheel, respectively, the frictional grip of the rear left wheel or the rear right wheels to the ground surface is ensured.

Figure 11:
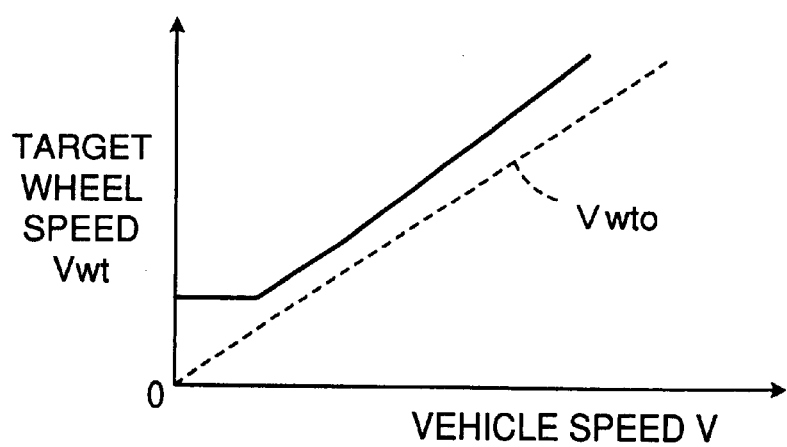
FIG. 11 is a graph showing a target wheel speed Vwt based upon vehicle speed V, indicating a standard slip against vehicle speed for a calculation of the friction circle radii.

In step 1692, a target wheel speeds denoted Vwt is calculated by referring to a map such as shown in FIG. 11 based upon vehicle speed V. In FIG. 11, the broken line Vwto indicates the wheel speed corresponding to the vehicle speed, i.e. the wheel speed when there is no tire slip against the ground surface. A target wheel speed Vwt for evaluating the slipping condition of the tire is determined as shown by a solid line in FIG. 11, taking an appropriate allowable slip.

In step 1693, it is judged if wheel speed Vwj (j=rl and r) detected by the wheel speed sensors 66RL and 66RR are each larger than the target wheel speed Vwt corresponding to the current vehicle speed V plus a first allowance value Vw1. When the answer is yes, it means that there is a high probability that the corresponding wheel, i.e. the rear left wheel or the rear right wheel, is making a relatively large slip against the ground surface. In this case, the control proceeds to step 1694, and count number Cs is incremented by 1, and the control proceeds to step 1695, where it is judged if the count number Cs has increased beyond a threshold value Cse. When the answer is yes, it means that such an over-slipping condition is continuing over a substantial time. In this case, the control proceeds to step 1696, and the friction circle radius Rmrl or Rmrr of the corresponding wheel is decreased by a decrement ΔRm. Then the control passes through step 1697, resetting the count Cs to zero, to proceeds to step 170. By the friction circle radius Rmrl or Rmrr or both are gradually decreased by the lapse of each predetermined period, the trimming of the traction forces Fxarl or Fxarr or both are trimmed in step 170 of FIG. 3 to be less, so that the overslipping condition due to an excessive control will soon disappear.

When the answer of step 1695 is no, i.e. when the over-slipping condition detected in step 1693 does not yet continue over a predetermined threshold period, the control proceeds to step 1698, and it is again judged if Vwj is larger than Vwt plus a second allowance value Vw2 larger than the first allowance value Vw1. If the answer is yes, the control for suppressing the over-slipping condition is more urgent. In this case, therefore, the control proceeds to step 1696 even before the predetermined count Cse is counted up in step 1695. When the answer of step 1698 is no, the control proceeds to step 170 of FIG. 3.

When the answer of step 1693 is no, it is assumed that there is no high slipping in the rear left and right wheels. In this case, the control proceeds to step 1699, and the count number Cs is reset to 0, and then the control proceeds to step 1700, and a certain standard friction circle radus Rmoj is regained by an increment ΔRm until it is accomplished. Then the control proceeds to step 170 of FIG. 3.

Figure 12:
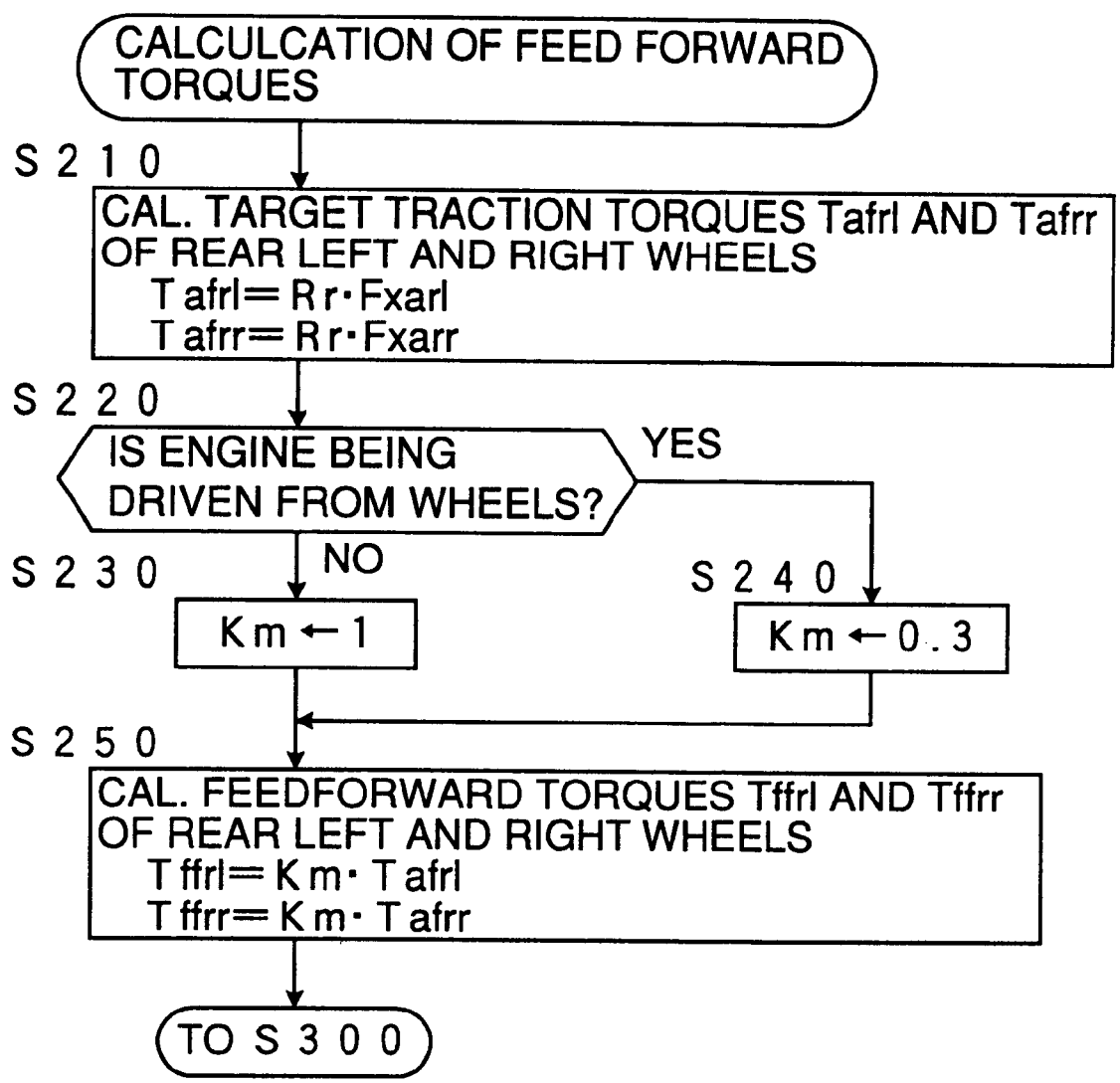
FIG. 12 is a flowchart showing a subroutine executed in step 200 of FIG. 2 for a calculation of feedforward torques of the rear left and right wheels.

Now, returning to the main control routine of FIG. 2, the details of step 200 will be described with reference to FIG. 12 showing a subroutine entitled Calculation of Feedforward Torques.

In step 210, target traction torques denoted Tafrl and Tafrr of the rear left and right wheels are calculated based upon the longitudinal forces Fxarl and Fxarr calculated in step 170 of FIG. 3, as follows, wherein Rr is the radius of the rear wheels. Thee radius Rr may be set to be constant or may be varied according to the tire air pressure, the load of the vehicle and others:

$$Tafrl=Rr\cdot Fxarl$$

$$Tafrr=Rr\cdot Fxarr$$

In step 220, it is judged if the engine is being driven from the rear wheels, i.e. the vehicle is in an engine braking condition. When the answer is no, the control proceeds to step 230, and a factor Km used in the next step is set to 1, whereas when the answer is yes, the control proceeds to step 240, and the factor Km is set to a value less than 1, such as 0.3, so that the feedforward control is less effected when the vehicle is running with an engine braking.

In step 250, feedforward torques denoted Tffrl and Tffrr of the rear left and right wheels are calculated based upon the target friction torques Tafrl and Tafrr calculated in step 210 and the factor Km determined in step 230 or 240 as follows:

$$Tffrl=Km\cdot Tafrl$$

$$Tffrr=Km\cdot Tafrr$$

Thus, the calculations of step 200 of FIG. 2 are completed, and the control proceeds to step 300 of FIG. 2, as already outlined.

Figure 13:
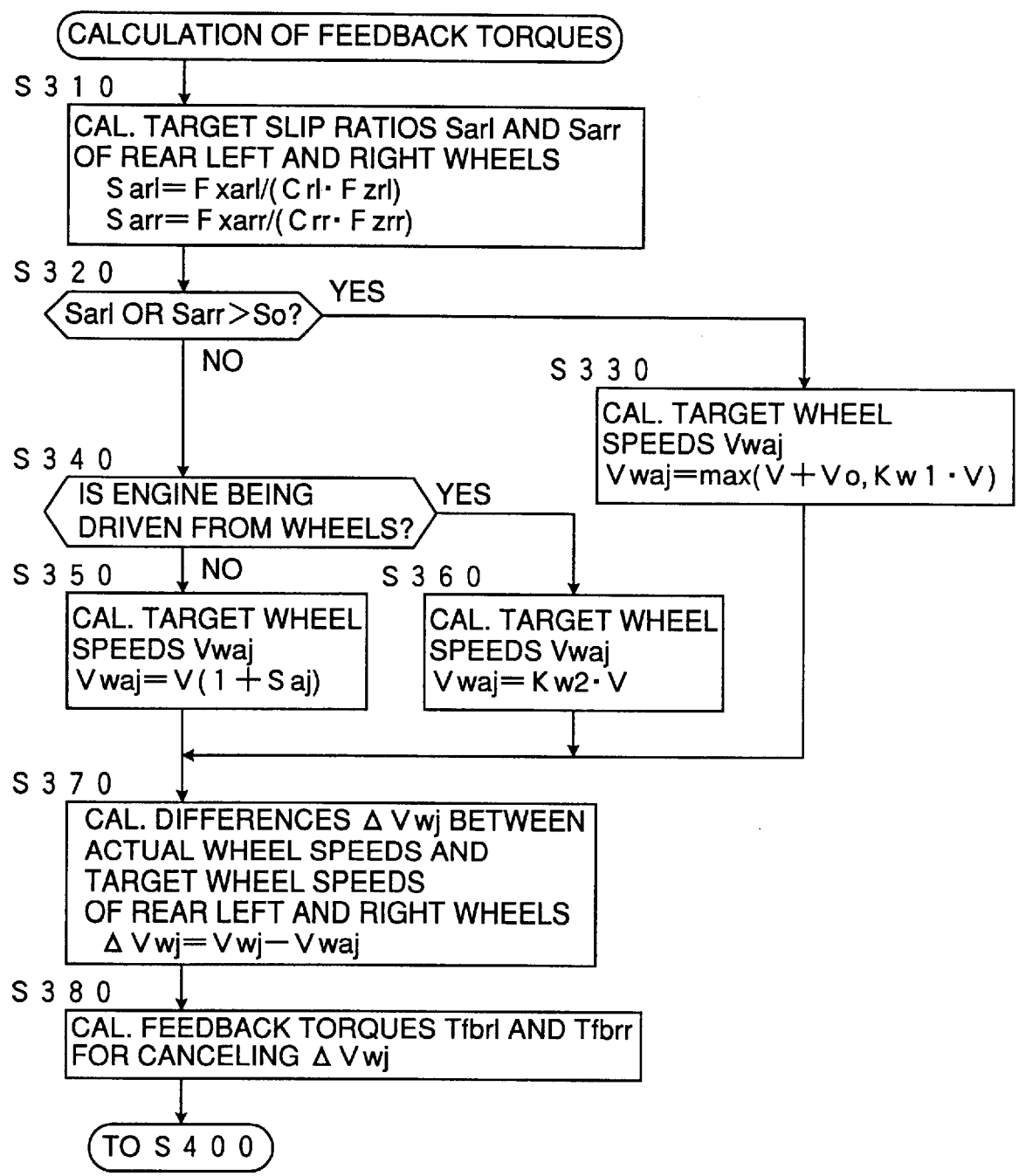
FIG. 13 is a flowchart showing a subroutine executed in step 300 of FIG. 2 for a calculation of feedback torques of the rear left and right wheels.

The calculations of step 300 of FIG. 2 will be described in detail with reference to FIG. 13 showing a subroutine entitled Calculation of Feedback Torques.

In step 310, target slip ratios denoted Sarl and Sarr of the rear left and right wheels are calculated based upon the target longitudinal forces Fxarl and Fxarr calculated in step 170 of FIG. 3, the ground contact forces Fzrl and Fzrr calculated in step 1634 or 1635 of FIG. 7, and factors Crf and Crr for estimating the slip ratios which will be occur at the tires of the rear left and right wheels pressed against the ground surface at such ground contact forces under the application of such longitudinal forces, respectively, as follows:

$$Sarl=Fxarl/(Crl \cdot Fzrl)$$

$$Sarr=Fxarr/(Crr \cdot Fzrr)$$

In step 320, it is judged if Sarl or Sarr is larger than a predetermined threshold value So. When the answer is yes, the control proceeds to step 330, and target wheel speeds Vwaj (j=rl and rr) are calculated to be a larger of a first amount such as an addition of the vehicle speed V detected by the vehicle speed sensor 62 and a certain positive value Vo, i.e. V+Vo, and a second amount such as Kw1·V, the factor Kw1 being a value slightly larger than 1 such as 1.05, so as to calculate the target wheel speeds Vwaj for the rear left and right wheels without depending on the calculated Sarl and Sarr. Then the control proceeds to step 370.

When the answer of step 320 is no, the control proceeds to step 340. and it is judged if the engine is being driven from the wheels, i.e., if the vehicle is in an engine braking condition. When the answer is yes, the control proceeds to step 360, and the target wheel speeds Vwaj are calculated as Kw2·V with a factor Kw2 slightly smaller than 1 such as 0.98, again without depending on the calculated Sarl and Sarr. Then the control proceeds to step 370.

When the answer of step 340 is no, the control proceeds to step 350, and the target wheel speeds Vwaj are calculated theoretically according to the slip ratios Saj, i.e. Sarf or Sarr, calculated in step 310, as follows:

$$Vwaj=V(1+Saj)$$

Then the control proceeds to step 370.

In step 370, differences ΔVwj (j=rl and rr) between the actual wheel speeds Vwj detected by the wheel speed sensors 66RL and 66RR and the target wheel speeds Vwaj calculated in step 330, 360 or 350 are calculated as follows:

$$\Delta Vwj=Vwj-Vwaj$$

In step 380, feedback torques Tfbrl and Tfbrr of the rear left and right wheels are calculated to be such values that will cancel the difference ΔVwj, respectively, according to the principle of the feedback control incorporating the PID performance well known in the art.

Thus, the calculations of step 300 are completed, and the control proceeds to step 400, as already outlined.

In step 400 of FIG. 2, as already outlined, the feedforward torques Tffrl and Tffrr and the feedback torques Tfbrl and Tfbrr are combined with the factor Kff weighting the combination for the feedforward control.

Figure 14:
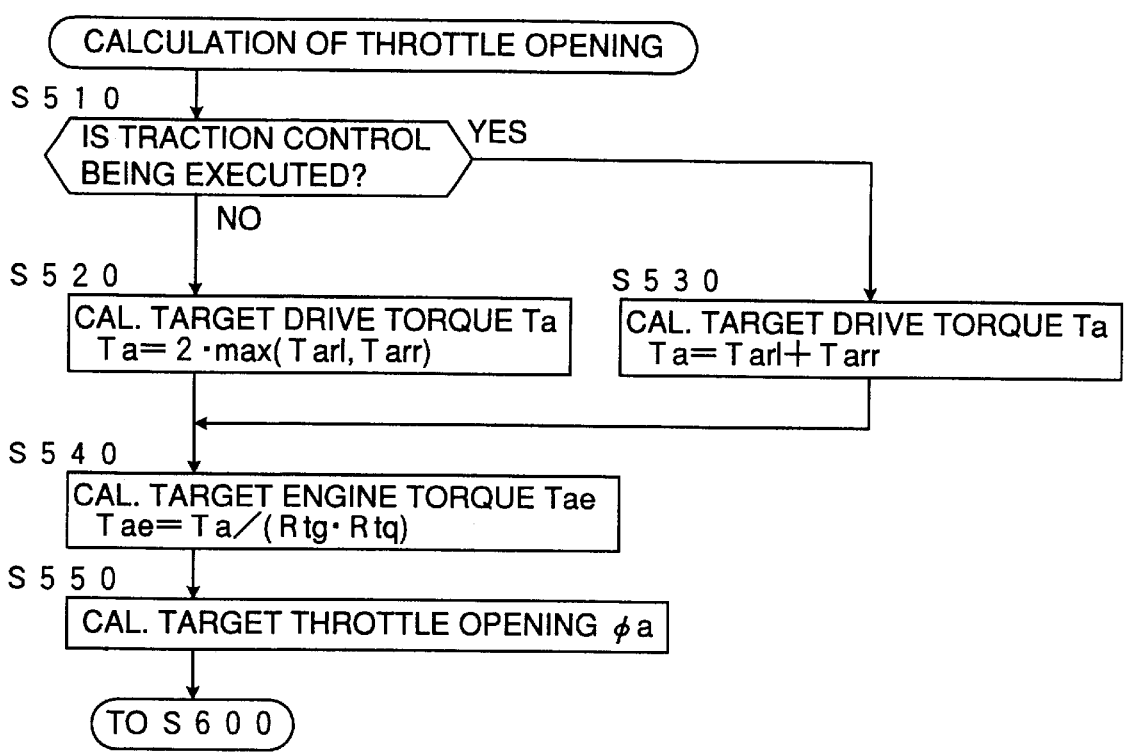
FIG. 14 is a flowchart showing a subroutine executed in step 500 of FIG. 2 for a calculation of target throttle opening $\phi$.

The details of the calculations executed in step 500 of FIG. 2 will be described with reference to FIG. 14 showing a subroutine entitled Calculation of Throttle Opening.

In step 510, it is judged if the traction control is being executed. When the answer is no, the control proceeds to step 520, and target drive torque Ta is calculated as a twice of the larger of Tarl and Tarr calculated in step 400 of FIG. 2, so as to expedite the startup of the traction control. When the answer of step 510 is yes, the control proceeds to step 530, and the target drive torque Ta is calculated as a sum of Tarl and Tarr.

In step 540, target engine torque Tae is calculated based upon the target drive torque Ta, current transmission gear ratio Rtg of the transmission 14, and torque ratio Rtg of the torque converter 12, as follows:

$$Tae=Ta/(Rtg \cdot Rtq)$$

In step 550, target throttle opening φa is calculated based upon the target engine torque Tae and engine rotation speed Ne by referring to a map not shown in the figure but well known in the art as empirically available with respect to each type of engine.

Thus, the calculations of step 500 of FIG. 2 are completed, and the control proceeds to step 600, as already outlined.

Figure 15:
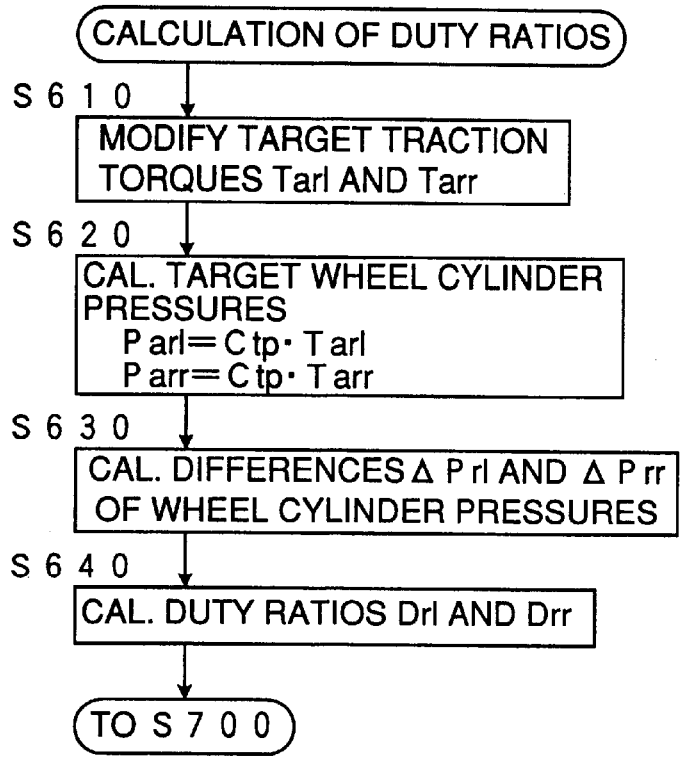
FIG. 15 is a flowchart showing a subroutine executed in step 600 of FIG. 2 for a calculation of duty ratios Drl and Drr for braking the rear left and right wheels.

The details of the calculations executed in step 600 of FIG. 2 will be described with reference to FIG. 15 showing a subroutine entitled Calculation of Duty Ratios.

In step 610, the target traction torques Tarl and Tarr calculated in step 400 of FIG. 2 are modified according to the target drive torque Ta calculated in step 520 of FIG. 14 and the differences ΔVwj between the actual wheel speeds and the target wheel speeds, with a gain Ktp of the proportioning term of the PID feedback control calculation made in step 380 of FIG. 13, as follows:

$$Tarl=Tarl-0.5 \cdot Ta+Ktp \cdot \Delta Vwrl$$

$$Tarr=Tarr-0.5 \cdot Ta+Ktp \cdot \Delta Vwrr$$

In step 620, target wheel cylinder pressures Parl and Parr of the wheel cylinders of the rear left and right wheels are calculated based upon the above modified Tarl and Tarr with a conversion factor Ctp, as follows:

$$Parl=Ctp \cdot Tarl$$

$$Parr=Ctp \cdot Tarr$$

In step 630, differences ΔPrl and ΔPrr between the target wheel cylinder pressures Parl and Parr and the actual wheel cylinder pressures Prl and Prr detected by the wheel cylinder pressure sensors 66RL and 66RR are calculated.

Figure 16:
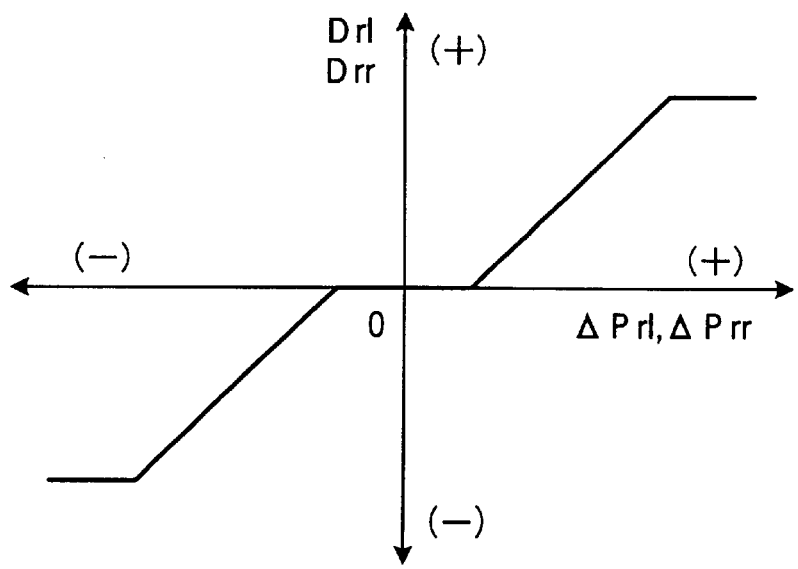
FIG. 16 is a graph showing duty ratios Drl and Drr for operating fluid control valves of the wheel cylinders for increase or decrease of the braking forces to be effected at the rear left and right wheels.

In step 640, duty ratios Drl and Drr of the duration for opening a supply valve and the duration for opening an exhaust valve (not shown in the figure but well known in the art and described in the above-mentioned U.S. Pat. No. 5,702,165) with respect to each of the wheel cylinders 46RL and 46RR are calculated based upon the differences ΔPrl and ΔPrr by referring to a map such as shown in FIG. 16, so that the hydraulic pressures of the wheel cylinders 46RL and 46RR are controlled to cancel the differences ΔPrl and ΔPrr, respectively.

Although the present invention has been described in detail with respect to some preferred embodiments thereof, it will be apparent for those skilled in the art that various modifications are possible with respect to the shown embodiments within the scope of the present invention.

What is claimed is:

1. A traction control system of a vehicle having a vehicle body, a plurality of wheels including at least one pair of driving wheels for suspending the vehicle body, an engine, a transmission for transmitting an output power of the engine to the driving wheels, a brake system for selectively braking rotation of at least the pair of driving wheels, and a steering system for steering the vehicle, the traction control system, comprising:

means for separately calculating a target traction torque of each of the pair of driving wheels in contrast to one another for a desired turning behavior of the vehicle based upon operating conditions thereof;

means for calculating a first traction share to be substantially proportional to the target traction torque;

means for calculating a target slip ratio of each of the pair of driving wheels which would be generated therein by the target traction torque if applied thereto;

means for detecting an actual wheel speed of each of the pair of driving wheels;

means for calculating a difference between a target wheel speed and the actual wheel speed of each of the pair of driving wheels, the target wheel speed being calculated based on the target slip ratio;

means for calculating a traction difference required to cancel the wheel speed difference in each of the pair of driving wheels;

means for calculating a second traction share to be substantially proportional to the traction difference; and means for controlling at least one of the engine and the brake system according to a sum of the first and second traction shares with a complementary adjustment thereof relative to one another such that the actual wheel speed of each of the pair of driving wheels coincides with the target wheel speed calculated therefor.

2. A traction control system according to claim 1, wherein the means for controlling at least one of the engine and brake system comprises:

means for controlling the engine to generate an output torque corresponding to the sum of the first and second traction shares when the sum is positive, while controlling the brake system to generate a braking torque at each of the pair of driving wheels corresponding to the sum of the first and second traction shares when said sum is negative.

3. A traction control system according to claim 1, wherein the sum of the first and second traction shares is a weighted sum of the target traction weighted by a feedforward control weighting factor and the traction difference weighted by a feedback control weighting factor complementary to one another.

4. A traction control system according to claim 3, wherein the feedforward control weighting factor is temporarily lowered when the vehicle is running with an engine braking.

5. A traction control system according to claim 1, wherein the means for calculating the second traction share comprises means for temporarily modifying the calculation of the second traction share to be dependent substantially upon vehicle speed when the vehicle is running with an engine braking.

6. A traction control system according to claim 1 wherein the means for calculating the second traction share comprises means for temporarily modifying the calculation of the second traction shares to be dependent substantially upon vehicle speed when the target slip ratio is larger than a predetermined threshold value.

7. A traction control system according to claim 1, wherein the target traction torque calculation means comprises:

means for calculating a yaw moment of the vehicle based upon steering angle of the steering system and vehicle speed;

means for equating the calculated yaw moment to a corresponding balance between a pair of traction forces of the pair of driving wheels;

means for equating a longitudinal acceleration of the vehicle to a corresponding sum of a pair of traction forces of the pair of driving wheels; and means for deducing the values of the pair of traction forces from the above two relationships with regard to the yaw moment and the longitudinal acceleration.

8. A traction control system according to claim 7, wherein the target traction torque calculation means further comprises:

means for calculating a friction circle of each of the pair of driving wheels; and means for trimming each of the deduced values of the pair of traction forces to be within each corresponding one of the friction circles calculated therefor.

9. A traction control system according to claim 8, wherein the friction circle calculation means comprises:

means for calculating each of longitudinal forces acting at the pair of driving wheels as a sum of a corresponding share of a force accelerating the vehicle at a longitudinal acceleration thereof, a force exerted thereto by the brake system, and a force for acceleration of rotation thereof against the inertia thereof;

means for calculating a longitudinal force acting at each of the pair of driving wheels as a sum of a corresponding share of a longitudinal force corresponding to an output torque of the torque converter calculated based upon rotation speed of the engine, a force exerted thereto by the brake system, and a force for acceleration of rotation thereof against the inertia thereof;

means for calculating each of ground contact forces acting at all of the wheels based upon longitudinal acceleration of the vehicle and lateral acceleration of the vehicle;

means for calculating slip angle of the vehicle based upon lateral acceleration of the vehicle, vehicle speed and yaw rate;

means for calculating each of cornering forces of the pair of driving wheels based upon vehicle speed, a time based differential of the calculated slip angle of the vehicle, yaw rate and a time based differential thereof of the vehicle, and the ground contact forces calculated for all of the wheels; and means for calculating a root of a sum of a square of the longitudinal force and a square of the cornering force with respect to each of the pair of driving wheels.

10. A traction control system according to claim 9, wherein the means for calculating the longitudinal forces acting at each of the pair of driving wheels cancels the longitudinal force based upon the output torque of the torque converter when the transmission is being shifted between speed stages.

11. A traction control system according to claim 8, wherein the friction circle calculation means further comprises means for judging if wheel speed of each of the pair of driving wheels is larger than vehicle speed beyond a first predetermined difference over a predetermined duration; and means for decreasing the radius of the friction circle of the corresponding wheel when the answer of the judgment is yes.

12. A traction control system according to claim 11, wherein the friction circle calculation means further comprises means for judging if wheel speed of each of the pair of driving wheels is larger than vehicle speed beyond a second predetermined difference larger than the first predetermined difference; and means for decreasing the radius of the friction circle of the corresponding wheel when the answer of the judgement is yes.

13. A traction control system according to claim 11, wherein the friction circle calculation means further comprises means for regaining the radius of the friction circle of the corresponding wheel when the answer of the judgment is no up to a standard friction circle radius.

* * * * *